United States Patent [19]

Keitzer et al.

[11] 4,003,143
[45] Jan. 18, 1977

[54] CHECK WRITING GUIDE

[75] Inventors: John E. Keitzer; Betty Jo Keitzer, both of Lake Wales, Fla.

[73] Assignee: Betty J. Keitzer, Lake Wales, Fla.

[22] Filed: Dec. 15, 1975

[21] Appl. No.: 640,462

[52] U.S. Cl. .................................................. 35/38
[51] Int. Cl.² .................................... G09B 21/00
[58] Field of Search .......... 35/38, 36, 37; 101/3 R; 283/45

[56] References Cited

UNITED STATES PATENTS

| | | | |
|---|---|---|---|
| 902,959 | 11/1908 | Gilman | 283/45 |
| 1,006,393 | 10/1911 | Montgomery | 35/37 |
| 1,870,145 | 8/1932 | Sharp | 35/38 |
| 2,913,836 | 11/1959 | Strunk | 35/38 |
| 3,340,625 | 9/1967 | Supitilov | 35/38 |
| 3,370,530 | 2/1968 | Henderson | 35/38 X |
| 3,731,402 | 5/1973 | Paul | 35/37 |

*Primary Examiner*—William H. Grieb
*Attorney, Agent, or Firm*—Woodard, Weikart, Emhardt & Naughton

[57] ABSTRACT

Disclosed is a multi-panel device for aiding the check writing of a blind person. One panel is formed by a backplate which has a cavity over which an apertured template is inserted, the template overlying a check which is slipped into the cavity. The apertures in the template position the writing on the check by the user of the guide. A second panel or base plate, hinged to the first panel acts as a stabilizing rest for the wrist area of the user.

2 Claims, 3 Drawing Figures

CHECK WRITING GUIDE

BACKGROUND OF THE INVENTION

Blind people have particular difficulty in writing bank checks since the size and placement of the required hand-written legends on checks are rigidly determined by the check form. Check writing aids for the blind are not unknown in the prior art, Henderson U.S. Pat. No. 3,370.530 is an example of the prior art construction. The present invention represents an improvement over such earlier structures.

The structure of the present invention is simple, easily manipulated and can be manufactured economically. It is relatively small in size and can be folded (panels in overlying relation) to become approximately the same size as a conventional pocket checkbook. It can easily be converted to make it suitable for use by left-handed persons. The hinged lower panel permits the whole assembly to be stabilized and held stationary by the arm and wrist area of the user.

DESCRIPTION OF THE PREFERRED EMBODIMENT

Figure 1:
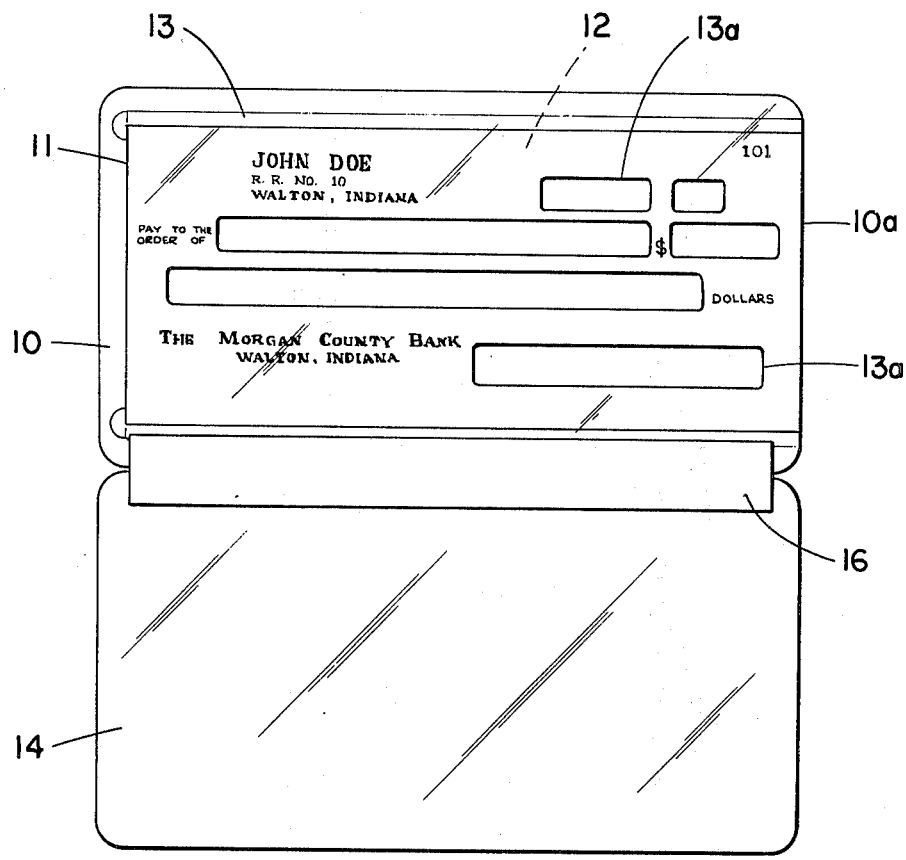
FIG. 1 is a top plan view of a structure embodying the present invention.

Referring to the drawings, the check writing guide of the present invention includes a rigid, generally rectangular backing plate 10. A central cavity 11 is formed in the plate 10 and the cavity extends to one end margin 10a of the backing plate. The cavity is sized to accommodate a conventionally sized bank check 12 which has been separated from its stub (not shown), and, it will be understood, the bank balance may be kept in Braille on the check stub.

Figure 2:
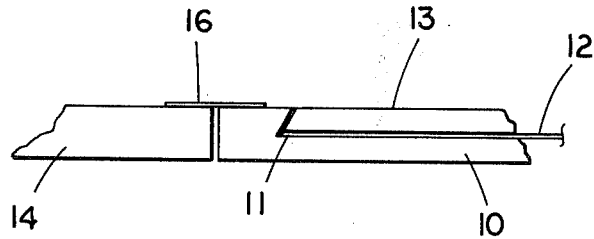
FIG. 2 is a fragmentary, side view of the structure shown in FIG. 1.
Figure 3:
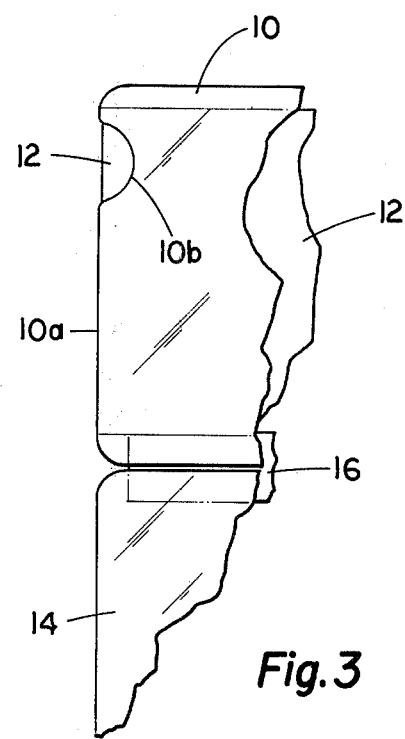
FIG. 3 is a plan view of the underside of the structure.

As may be seen in FIG. 3, the underside of plate 10 is provided with a finger-tip sized cut-away portion 10b which facilitates removal of a check from the cavity when the template, to be subsequently described, is in place. The template is identified at 13 and consists of a plate which overlies and closes the cavity 11. As may best be seen in FIG. 2, the adjacent longitudinal walls of the cavity and long-dimension walls of template 13 have a matching dove-tail groove configuration as indicated in FIG. 2. This permits template 13 to be inserted and removed from the cavity 11 only by sliding the template horizontally across margin 10a of backing plate 10 and in the plane of the plate.

As will be evident from FIG. 1 the template 13 is apertured, as indicated at 13a, to provide for placement of the date, payee, amount and signature at the conventional locations on the check underlying the template.

A base plate 14, having substantially the same size as plate 10, is hinged to the backing plate 10 along the adjacent margins of the plate. As shown in the drawings the hinge means joining the two plates takes the form of a strip 16 of flexible adhesive tape which permits plate 14 to be folded back into face-to-face relation with plate 10 when the check writing guide is not in use, the folded configuration thus permitting the guide to be carried in a clothing pocket or purse much as a conventional bank check book is carried. It will be understood that the hinge means might take forms other than the flexible, adhesive tape strip 16. While the plates 10 and 14 and template 13 are illustrated in the drawings, for clarity, as transparent, it will be understood that, preferably, they are formed of opaque, black high density polyethylene or the like. Colors other than black for the plates might, of course, be used.

In operation, a blank check may be inserted through the open end of the cavity at 10a and when the leading margin of the check is stopped by the closed end of the cavity, the check will be positioned so that apertures 13a overlie the areas on which handwriting is to be applied. As the user writes in the proper material the wrist area of the user rests upon the surface of plate 14 providing a stabilizing force holding plate 10 stationary as the handwriting proceeds. After filling in the check has been completed, it can be pulled from the cavity by gripping it at the cut-away portion 10b (FIG. 3).

Removal of template 13 from the cavity permits modification of the apparatus for use by left-handed persons. When a left-handed writer is to use the device, the template 13 is removed horizontally and retained in place while the two hinged plates 10 and 14 are rotated through 180° in the plane of FIG. 1. This places plate 14 above plate 10 and the open end 10a of the cavity is then on the left-hand side of the assembly. The template 13 may now be reinserted into the cavity past the edge 10a. A check may be inserted into the cavity under the template from the left-hand side of the assembly and the apertures 13a in the template will again register with the proper spaces on the check. The base plate 14 will now be adjacent the top margin of the check and this will be its proper place since almost all left-handed writers position the wrist area of their left-hand higher on the writing surface than the lines being written. The plate 14 thus, again, acts as a stabilizing member for the plate 10 and the accommodated check.

While the invention has been disclosed and described in some detail in the drawings and foregoing description, they are to be considered as illustrative and not restrictive in character, as other modifications within the scope of the invention may readily suggest themselves to persons skilled in the art.

We claim:

1. A check writing guide for use by the blind comprising a rigid generally rectangular backing plate, a rectangular cavity formed in one face of said backing plate sized to freely accommodate a conventional blank bank check and extending to one end margin of said backing plate, a template insertable in said cavity from said one end margin of the backing plate for closing the cavity and overlying a check received therein, said template being apertured to guide the hand-written information conventionally applied to a check, and a base plate having substantially the same size as said backing plate and hinged thereto along adjacent long margins of the plates, whereby a check may be inserted at said one margin of said backing plate into said cavity and under said template, the base plate serving as a stabilizing rest for the wrist of the check writer and the orientation of said base plate with respect to said backing plate and template being reversible by removing said template, rotating said backing plate through 180°, and then reinserting the template into said cavity thereby accommodating the stabilizing rest function of the base plate to either right or left handed users.

2. A check writing guide as claimed in claim 1 in which the longitudinal walls of said cavity and the long-dimension sides of said template have a matching dove-tail groove configuration so that said template can be inserted in said cavity only by sliding it across said one margin of the backing plate and in the plane of the backing plate.

* * * * *